United States Patent

Pearson

[15] 3,668,144
[45] June 6, 1972

[54] DUST-FREE LEAD STABILIZER FOR SYNTHETIC RESINS

[72] Inventor: Derek Gordon Pearson, Denham, England

[73] Assignee: Associated Lead Manufacturing Limited, London, England

[22] Filed: Mar. 6, 1970

[21] Appl. No.: 17,294

[30] Foreign Application Priority Data

Mar. 10, 1969 Great Britain......................12,496/69

[52] U.S. Cl..............................252/400, 252/182, 252/316, 260/18, 260/45.75 R, 260/414, 260/435 R, 117/167
[51] Int. Cl....................B01j 1/16, C08f 45/58, C08g 51/58
[58] Field of Search..................................252/400, 182, 316; 260/45.75 R, 23, 414, 435 R, 18; 117/167

[56] References Cited

UNITED STATES PATENTS

| 3,461,081 | 8/1969 | Sugahara et al. | 252/400 |
| 3,519,571 | 7/1970 | Szczepanek et al. | 252/400 |
| 3,002,943 | 10/1961 | Kebrich | 252/400 |
| 3,355,420 | 11/1967 | Friedman et al. | 252/400 |
| 3,499,868 | 3/1970 | Roussos et al. | 252/400 |

*Primary Examiner*—Richard D. Lovering
*Assistant Examiner*—Irwin Gluck
*Attorney*—Cushman, Darby & Cushman

[57] ABSTRACT

A dust-free lead stabilizer mix which consists of a basic lead salt of an inorganic acid enveloped in an organic liquid which has been gelled by the addition to it of a lubricating stabilizer.

10 Claims, No Drawings

DUST-FREE LEAD STABILIZER FOR SYNTHETIC RESINS

Basic lead salts of inorganic acids are in common use as non-lubricating stabilizers for vinyl resins and it is known to supply such stabilizers to plastics manufacturers in the form of particles having a surface coating of lead stearate which facilitates dispersion of the stabilizers in the resin. Lead stearate and other metal soaps of fatty acids are termed lubricating stabilizers because they have both a lubricating and a stabilizing effect on the resin in which they are incorporated.

Basic lead salts of inorganic acids are toxic and various proposals have been made to reduce the tendency of such a stabilizer to form dust which will be inhaled with injury to health during incorporation of the stabilizer in the resin. The use of basic lead stabilizer plasticizer pastes overcomes this problem, but the use of paste may require complicated handling machinery and may also cause difficulty in the preparation of 'dry blends'. 'Dry blends' are mixed P.V.C. (polyvinyl/chloride) compounds before fusion and are usually transported to the mixing machine by screw feed or air blowing. Also pastes are seldom suitable for use in making rigid P.V.C.

The present invention provides a dust-free lead stabilizer mix which consists of a basic lead salt of an inorganic acid enveloped in an organic liquid which has been gelled by addition to it of a lubricating stabilizer, such for example as lead stearate. When such addition is made, the organic liquid gels to form a solid which melts at a temperature below that of the lubricating stabilizer. Thus lead stearate has a melting point of 105° C, whereas a gel made from lead stearate and containing 10 percent by weight of paraffin oil becomes fluid at a temperature of 60° C. Preferably the gel contains at least 5 percent by weight of the organic liquid.

A gelled stabilizer composition according to the invention may be prepared as follows:

The basic lead stabilizer i.e., the basic lead salt of an inorganic acid, is added to the organic liquid as a dry powder and sufficient lubricating stabilizer is then added to produce a final gel. The mixture is heated until gelation takes place (tested by cooling a small sample of the mixture) and the mixture is allowed to cool. Alternatively the mixture may be made by a flushing technique, i.e. by mixing an aqueous slurry of the basic lead stabilizer and the lubricating stabilizer with the organic liquid, decanting displaced water and heating to remove entrapped water and form the gel. The product may be broken into small lumps in any convenient way. Alternatively the mixture may be formed into pellets without previous cooling in a pelleting machine or extruded hot by an extruder which cuts it into chips.

The basic lead stabilizer may, for example, consist of tribasic lead sulphate, tetrabasic lead sulphate, dibasic lead phosphite, white lead (basic lead carbonate) or mixtures thereof. The lubricating stabilizer may consist of the calcium, barium, strontium, magnesium, zinc, lithium, cadmium, aluminum or lead soaps of an aliphatic carboxylic acid having from eight–22 carbon atoms or mixtures thereof. Also the dibasic lead soaps of such acids may be used alone or mixed with any of the above soaps. The organic liquid may be a plasticizer or extender used in the preparation of polyvinyl chloride such as a paraffin oil, an aromatic oil, an ester, a chlorinated paraffin, a chlorinated aromatic hydrocarbon or mixtures thereof.

Good results have been obtained using as the organic liquid paraffin oil of medicinal quality sold by Shell as Ondina.

It is possible to produce compositions suitable for use in rigid P.V.C. compositions which contain less than 1 percent overall weight of paraffin oil.

Sufficient liquid and lubricating stabilizer must be present in the composition to bind the basic lead stabilizer and the minimum quantity required will vary with the particle size of the basic lead stabilizer and the nature of the liquid, i.e. its viscosity and polarity. In some cases a total amount by weight of 5 percent of oil and lubricating stabilizer will suffice and in other cases 15 percent by weight may be required.

The proportion of lubricating stabilizer to liquid must be sufficient to form a solid gel on cooling, but this depends on the gelling effectiveness of the lubricating stabilizer and the nature of the organic liquid. With lead stearate and paraffin oil a minimum of 400 gms of normal lead stearate was required to gel 1,000 mls of paraffin oil, whereas 2,000 gms of dibasic lead stearate were required to gel the same amount of paraffin oil. Also in the presence of the basic lead stabilizer some of the organic liquid is absorbed by the particles thereof and less lubricating stabilizer is needed to form a gel; for instance a satisfactory product was obtained with 700 gms tribasic lead sulphate, 62 mls paraffin oil and 22 gms of dibasic lead stearate.

Generally speaking the total amount of liquid plus lubricating stabilizer in the composition will not exceed 50 percent by weight.

The temperature of gelatin varies with the lubricating stabilizer. Thus using paraffin oil as the organic liquid gelatin was obtained at 50° C. with normal lead stearate, 70°–80° C. with dibasic lead stearate and 100° C. with normal barium stearate.

If desired the mixture may also contain a wax having in the molecule a long saturated carbon chain, for example containing 10–25 carbon atoms. In this case the wax becomes gelled together with the organic liquid. The proportion of wax should be such that the mixture contains at least 10 percent of gelled organic liquid based on the weight of the wax. Examples of suitable waxes are paraffin wax, natural waxes such as montan wax, low molecular weight polyethylene, higher fatty alcohols, higher fatty acids, higher fatty acid esters, chlorinated hydrocarbons and amides of higher fatty acids.

EXAMPLES a. 700 gms of tribasic lead sulphate were mixed with 56 gms of paraffin oil and 22 gms of dibasic lead stearate. The mixture was heated to 85° C. and cooled. The cooled solid material was mixed in a cold kneader to produce dust-free granules.

b. Twenty lbs. of tribasic lead sulphate were mixed with 4 lbs. of lead decoate and 0.63 lbs. of dioctyl phthalate plastizer. The mixture was heated at 90° C. to gel the plastizer. The gelled composition was cooled and broken into pellets.

c. Two thousand lbs. of white lead (basic lead carbonate) were mixed with 250 lbs. of stearic acid in an aqueous slurry. The resulting slurry was flushed into 150 lbs. of paraffin oil. The displaced water was decanted and the mixture of white lead, lead stearate (formed by reaction of the stearic acid with the white lead) and paraffin wax heated at 80° C. to remove the entrapped water and gel the oil. The mixture was then cooled and formed into pellets.

d. Two hundred gms of dibasic lead phosphite were mixed with 25 gms of liquid Cereclor S45 (a chlorinated hydrocarbon extender for plasticized P.V.C.) and 25 gms of calcium stearate. The mixture was heated to 85° C. and cooled. The gelled material was mixed in a cold kneader to produce dust-free granules.

e. Two hundred gms of tetrabasic lead sulphate, 16 gms of paraffin wax, 4 gms of lead stearate and 4 gms of dialphanyl phthalate plasticizer were mixed and heated to 80° C. to gel the wax and plasticizer. After heating the mixture was cooled, broken into lumps and granulated in a flying hammer mill.

What I claim as my invention and desire to secure by Letters Patent is:

1. A dust-free lead stabilizer mix which consists of particles of a basic lead salt of an inorganic acid enveloped in an organic liquid selected from the group consisting of paraffin oils, aromatic oils, esters, chlorinated paraffins and chlorinated aromatic hydrocarbons which has been gelled by the addition to it of a lubricating stabilizer consisting of a metal salt of a fatty acid wherein said metal is selected from the group consisting of calcium, barium, strontium, magnesium, zinc, lithium, cadmium, aluminum, and lead.

2. A mix as claimed in claim 1, in which the lubricating stabilizer is lead stearate.

3. A mix as claimed in claim 1 in which the organic liquid is paraffin oil.

4. A mix as claimed in claim 1, in which the gel contains at least 5 percent by weight of the organic liquid.

5. A mix as claimed in claim 3, which contains less than 1 percent overall weight of paraffin oil.

6. A mix as claimed in claim 1, which also contains a gelled wax, the amount of gelled organic liquid being at least 10 percent by weight of the wax.

7. A method of preparing a dust-free lead stabilizer mix which comprises the steps of (a) forming a mixture of a particulate basic lead salt of an inorganic acid, a metal soap of a fatty acid wherein said metal is selected from the group consisting of calcium, barium, strontium, magnesium, zinc, lithium, cadmium, aluminum and lead and an organic liquid selected from the group consisting of paraffin oils, aromatic oils, esters, chlorinated paraffins and chlorinated aromatic hydrocarbons, (b) heating said mixture to effect gelation of said organic liquid, (c) cooling the mixture and (d) breaking the cooled mixture into small lumps.

8. A method as claimed in claim 7, in which the basic lead salt and a metal soap are mixed as an aqueous slurry with the organic liquid and the displaced water is decanted from the mixture prior to heating.

9. A method as claimed in claim 7, in which the basic lead salt of the inorganic acid is incorporated in the mixture as a dry powder.

10. A method of preparing a dust-free lead stabilizer mix which comprises the steps of (a) forming a mixture of a particulate basic lead salt of an inorganic acid, a metal soap of a fatty acid wherein said metal is selected from the group consisting of calcium, barium, strontium, magnesium, zinc, lithium, cadmium, aluminum and lead, a wax, and an organic liquid selected from the group consisting of paraffin oils, aromatic oils, esters, chlorinated paraffins and chlorinated aromatic hydrocarbons, said mixture containing at least 10% of organic liquid based on the weight of the wax, (b) heating said mixture to effect gelation of said organic liquid, (c) cooling the mixture and (d) breaking the cooled mixture into small lumps.

\* \* \* \* \*